United States Patent
Amirloo Abolfathi et al.

(10) Patent No.: US 11,994,862 B2
(45) Date of Patent: May 28, 2024

(54) METHOD AND SYSTEM FOR TRAINING REINFORCEMENT LEARNING AGENT USING ADVERSARIAL SAMPLING

(71) Applicants: Elmira Amirloo Abolfathi, North York (CA); Jun Luo, Toronto (CA); Peyman Yadmellat, North York (CA)

(72) Inventors: Elmira Amirloo Abolfathi, North York (CA); Jun Luo, Toronto (CA); Peyman Yadmellat, North York (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 999 days.

(21) Appl. No.: 16/920,598

(22) Filed: Jul. 3, 2020

(65) Prior Publication Data

US 2021/0004647 A1    Jan. 7, 2021

Related U.S. Application Data

(60) Provisional application No. 62/871,135, filed on Jul. 6, 2019.

(51) Int. Cl.
  *G06N 3/08*    (2023.01)
  *G05D 1/00*   (2006.01)
  (Continued)

(52) U.S. Cl.
  CPC ......... *G05D 1/0088* (2013.01); *G06F 18/214* (2023.01); *G06F 18/217* (2023.01); *G06N 3/047* (2023.01); *G06N 3/08* (2013.01)

(58) Field of Classification Search
  None
  See application file for complete search history.

(56) References Cited

U.S. PATENT DOCUMENTS

| | | |
|---|---|---|
| 10,254,759 B1 | 4/2019 | Faust et al. |
| 2014/0025613 A1 | 1/2014 | Ponulak |
| 2019/0126472 A1 | 5/2019 | Tunyasuvunakool et al. |

FOREIGN PATENT DOCUMENTS

| | | |
|---|---|---|
| CN | 107145936 A | 9/2017 |
| CN | 108196535 A | 6/2018 |

OTHER PUBLICATIONS

Sallab, Ahmad EL, et al. "Deep reinforcement learning framework for autonomous driving." arXiv preprint arXiv:1704.02532 (2017). (Year: 2017).*

(Continued)

*Primary Examiner* — Daniel T Pellett

(57) ABSTRACT

Methods and systems of training RL agent for autonomous operation of a vehicle are described. The RL agent is trained using uniformly sampled training samples and learning a policy. After the RL agent has achieved a predetermined performance goal, data is collected including a sequence of sampled states, and for each sequence of sampled states, agent parameters, and an indication of failure of the RL agent for the sequence. A failure predictor is trained, using samples from the collected data, to predict a probability of failure of the RL agent for a given sequence of states. Sequences of states are collected by simulating interaction of the vehicle with the environment. Based on a probability of failure outputted by the failure predictor, a sequence of states is selected. The RL agent is further trained based on the selected sequence of states.

18 Claims, 4 Drawing Sheets

(51) Int. Cl.
    *G06F 18/21*     (2023.01)
    *G06F 18/214*     (2023.01)
    *G06N 3/047*     (2023.01)

(56) References Cited

OTHER PUBLICATIONS

Ma, Xiaobai, Katherine Driggs-Campbell, and Mykel J. Kochenderfer. "Improved robustness and safety for autonomous vehicle control with adversarial reinforcement learning." 2018 IEEE Intelligent Vehicles Symposium (IV). IEEE, 2018. (Year: 2018).*

Pattanaik, Anay, et al. "Robust deep reinforcement learning with adversarial attacks." arXiv preprint arXiv:1712.03632 (2017). (Year: 2017).*

Pinto, Lerrel, et al. "Robust adversarial reinforcement learning." International Conference on Machine Learning. PMLR, 2017. (Year: 2017).*

Uesato, Jonathan, et al. "Rigorous agent evaluation: An adversarial approach to uncover catastrophic failures." arXiv preprint arXiv:1812.01647 (2018). (Year: 2018).*

Ma, Xiaobai et al. Improved Robustness and Safety for Autonomous Vehicle Control with Adversarial Reinforcement Learning, 2018 IEEE Intelligent Vehicles Symposium, Changshu, Suzhou, China, Jun. 26-30, 2018, pp. 1665-1671. 2018.

* cited by examiner

METHOD AND SYSTEM FOR TRAINING REINFORCEMENT LEARNING AGENT USING ADVERSARIAL SAMPLING

CROSS-REFERENCE TO RELATED APPLICATIONS

The present application claims priority from U.S. provisional patent application No. 62/871,135, filed Jul. 6, 2019, the entirety of which is hereby incorporated by reference.

FIELD

The present application relates generally to training a reinforcement learning agent and, more specifically, to method and system for training a reinforcement learning agent using an adversarial sampling method.

BACKGROUND

Reinforcement learning (RL) is an area of machine learning concerned with the manner in which a software agent ought to take actions in an environment so as to maximize some notion of a cumulative reward. The software agent learns by interacting with its environment. When the software agent (an "RL agent") starts to learn to perform a task, the RL agent often fails to complete the task. As the RL agent learns to perform the task, the RL agent becomes more robust and the RL agents fails less often to complete the task. For one example, a vehicle that includes an RL agent can autonomously operate (e.g., drive) the vehicle in an environment. As the RL agent starts to learn to operate (e.g., drive) the vehicle in the environment, the vehicle may crash (i.e., fail) many times until the RL agent learns how to operate (e.g., drive) the vehicle safely. However, it is expected that, as the RL agent learns to operate (e.g. drive) the vehicle safely, the number of failures decreases.

SUMMARY

In various examples, the present disclosure describes methods and systems which help to improve training of an RL agent, which may be implemented in an autonomous vehicle. In the context of the present disclosure, the surroundings in which the autonomous vehicle operations are defined as the environment. A state of the vehicle is defined as a representation of the environment, as well as the vehicle within that environment. In the disclosed examples, instead of training using only uniformly sampled states, training of the RL agent may be improved by sampling states that are more challenging (e.g., associated with a higher probability of failure of the RL agent). In this way, the training process may be more sample efficient, because the sampled states used for training may be selected to focus training on more challenging states.

In some examples, the present disclosure describes a method of training a reinforcement learning (RL) agent for autonomous operation of a vehicle. The method includes: training the RL agent by: obtaining training samples by uniformly sampling a state space including all possible states of the vehicle and the environment; and learning a policy to map sampled states to actions outputted by the RL agent, the policy being learned by updating parameters of a neural network. The method also includes: determining that the RL agent has achieved a predetermined performance goal; collecting data, collected data including a sequence of sampled states, the collected data further including, for each sequence of sampled states, agent parameters, and an indication of failure of the RL agent for the sequence; training, using samples from the collected data, a failure predictor to predict a probability of failure of the RL agent for a given sequence of states; simulating interaction of the vehicle with the environment to collect a plurality of sequences of states; selecting, using the probability of failure outputted by the failure predictor, in a stochastic sampling method, a selected sequence of states from among the plurality of sequences of states; and further training the RL agent based on the selected sequence of states.

In any of the above examples, the failure predictor may be configured to predict, based on each sequence of states among the plurality of sequences of states, a likelihood of failure for the RL agent.

In any of the above examples, training the failure predictor may include optimization using an optimization algorithm selected from a Stochastic Gradient Descent family of optimizers.

In any of the above examples, the method may include repeating the simulating, selecting and further training until a predetermined number of repetitions is reached.

In any of the above examples, the stochastic sampling method for selecting the selected sequence of states may be a rejection sampling algorithm to reject sequences based on the probability of failure. Sequences with a higher probability of failure may be selected.

In any of the above examples, collecting data may be initiated after training the RL agent for a predetermined number of iterations.

In some examples, the present disclosure describes a system for training a reinforcement learning (RL) agent for autonomous operation of a vehicle. The system includes: a memory; and a processor coupled to the memory. The processor is configured to execute instructions stored in the memory, to cause the system to perform any of the methods described above.

In some examples, the present disclosure describes a computer-readable medium storing instructions. The instructions, when executed by a processor, cause a processor to train a reinforcement learning (RL) agent for autonomous operation of a vehicle using any of the methods described above.

Other aspects and features of the present disclosure will become apparent to those of ordinary skill in the art upon review of the following description of specific implementations of the disclosure in conjunction with the accompanying figures.

BRIEF DESCRIPTION OF THE DRAWINGS

Reference will now be made, by way of example, to the accompanying drawings which show example implementations; and in which.

DETAILED DESCRIPTION

The present disclosure is made with reference to the accompanying drawings, in which embodiments are shown.

However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements, operations or steps in alternative embodiments. Separate boxes or illustrated separation of functional elements of illustrated systems and devices does not necessarily require physical separation of such functions, as communication between such elements may occur by way of messaging, function calls, shared memory space, and so on, without any such physical separation. As such, functions need not be implemented in physically or logically separated platforms, although they are illustrated separately for ease of explanation herein. Different devices may have different designs, such that although some devices implement some functions in fixed function hardware, other devices may implement such functions in a programmable processor with code obtained from a machine readable medium.

Some examples of the present disclosure are described in the context of autonomous vehicles. It should be understood that in some instances the autonomous vehicle may be simulated, or running in a simulator, rather than a real-life vehicle in a real-life environment. Although examples described herein refer to a car as the autonomous vehicle, the teachings of the present disclosure may be implemented in other forms of autonomous or semi-autonomous vehicles including, for example, trams, subways, trucks, buses, watercraft, aircraft, ships, drones (also called unmanned aerial vehicles (UAVs)), warehouse equipment, construction equipment or farm equipment, and may include vehicles that do not carry passengers as well as vehicles that do carry passengers. The methods and systems disclosed herein may also be suitable for implementation in non-vehicular devices, for example autonomous vacuum cleaners and lawn mowers.

The present disclosure refers, in some examples, to a RL agent that include neural networks. It should be understood that the RL agent of the present disclosure may implement any model learned using reinforcement learning in place of the neural network.

Figure 1:
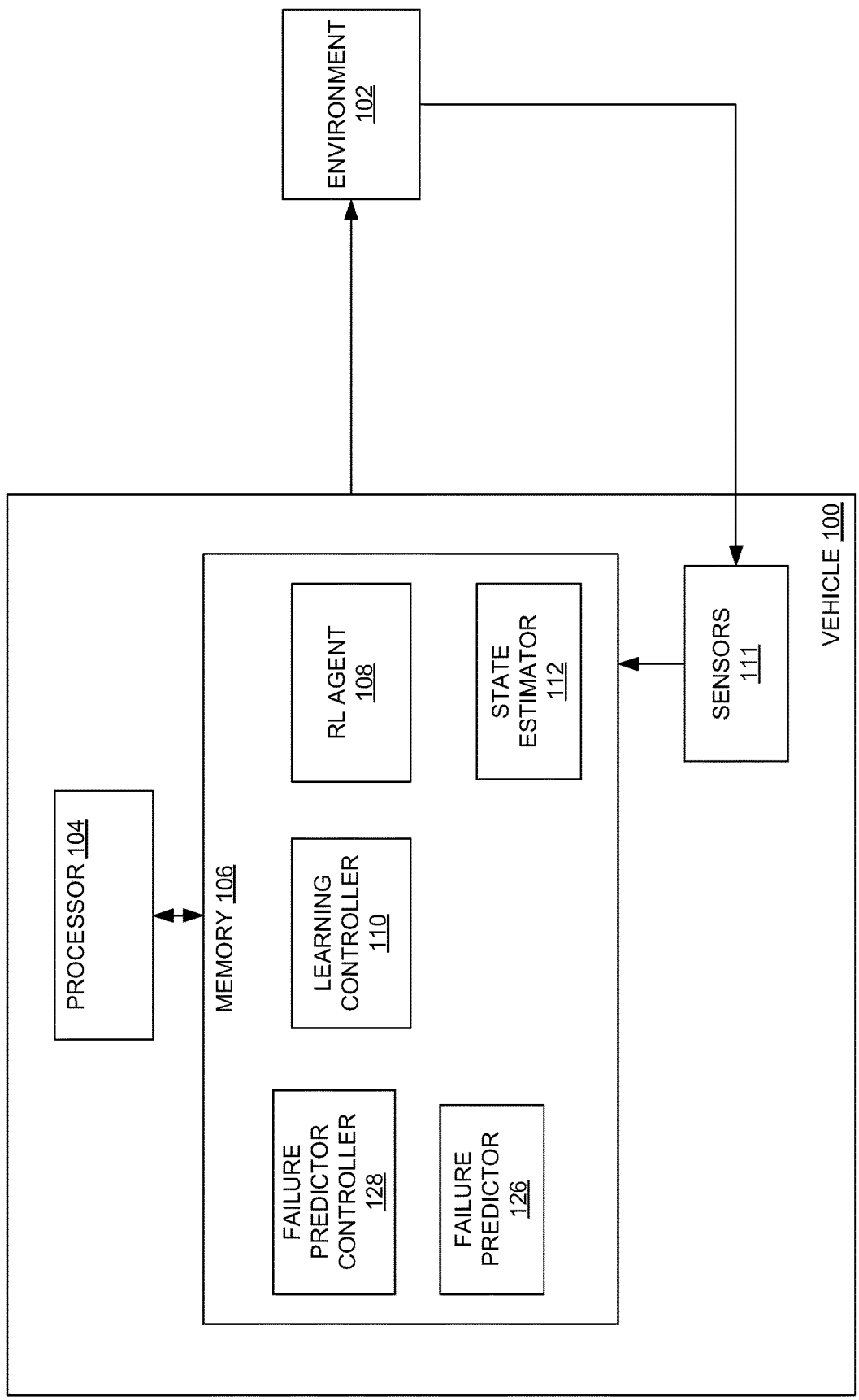
FIG. 1 illustrates an example of a device that may be used to implemented examples of the present disclosure.

To assist in understanding the present disclosure, reference is first made to FIG. 1.

FIG. 1 illustrates an example autonomous vehicle 100 (simply referred to as vehicle 100) interacting with an environment 102. The vehicle 100 includes a processor 104 and a memory 106. The processor 102 executes instructions, stored in the memory 106, to implement an RL agent 108. The RL agent 108 is trained to perform a desired task. For example, the RL agent 108 may be trained to drive the vehicle 100 in a safe manner (e.g., collision-free, free of sudden large changes in speed or acceleration, etc.) to reach a target destination. The RL agent 108 may be trained to perform specific drive tasks, such as parking, lane changing, following a turn, etc.

The vehicle 100 includes sensors 111 (e.g., camera, light detection and ranging (LIDAR) unit, radar unit, inertial measurement unit (IMU), speedometer, accelerometer, steering angle sensor, wheel traction sensor, etc.) to capture information about the environment surrounding the vehicle 100 as well as information about the vehicle 100 itself. The sensors 111 may include vehicle-mounted sensors as well as vehicle-internal sensors. Some of the sensors 111 may, for example, provide the information about the vehicle 100 itself such as distance measurements, speed measurements, or other such information in the form of sensor data. The sensors 111 may also capture information about the environment, and generate respective sensor data representation of the information in real-time or near real-time. Sensor data is provided to a state estimator 112. The processor 102 executes instructions stored in the memory 106 to implement the state estimator 112.

The state estimator 112 receives sensor data from the sensors 111, and determines a state $s_t$ of the vehicle 100 and the environment at a current time t. The state estimator 112 uses the sensor data received from the sensors 111 to determine the state $s_t$ of the vehicle 100 and its environment at a current time t may, for example, include information such as the vehicle speed, engine RPM and transmission gear, among other possibilities. The sensor data may be processed (e.g., using an image-based classifier) to provide information about the environment at the current time t, and the state may include such information as the condition of the road surface (e.g. gravel, asphalt, concrete, wet asphalt, snow, ice, etc.), surrounding objects (e.g., cars, pedestrians, immobile objects, etc.), location of lane markers, etc., and the state at the current time t may include such information.

The state at time t is sampled by the RL agent 108. The RL agent 108, using a learned policy, generates an action to be executed by the vehicle 100. For example, the action may be outputted to a vehicle controller (not shown) that converts the action (which may be represented mathematically as a vector) into control signals to control an electromechanical system (not shown) of the vehicle 100. Execution of the action may cause a change in the environment 102 and also a change in the vehicle 100. The RL agent 108 implements a policy that is learned to accomplish the desired task, generally by modeling a function to map the state to an action.

To improve operation of the RL agent 108, the processor 104 also executes instructions to implement a learning controller 110, a failure predictor 126 and a failure predictor controller 128, as discussed further below.

In the present disclosure, the term "scenario" refers to a sequence of states that occur during interaction of the RL agent 108 with the environment 102. A scenario may be understood to include an initial state (at time $t_0$) and the subsequent states (for some predefined time, such as 1000 seconds) that are outputted by the state estimator 111 as the vehicle 100 executes the actions generated by the RL agent 108.

In the present disclosure, the term "agent parameter" may refer to a value used to define a character of the RL agent 108. For example, when the RL agent 108 is implemented using a neural network (e.g., the learned policy of the RL agent is modeled by a neural network), the term "agent parameters" may include the weights of the neural network. Agent parameters may also include values govern the training algorithm, such as a number of training iterations.

In the present disclosure, the term "optimizer" may be used to refer to a software and/or hardware component used in the training and evaluation of the RL agent 108. For example, the optimizer may be used for updating an optimization algorithm (e.g., stochastic gradient descent family of optimization algorithms) for updating the weights of a neural network of the RL agent.

The RL agent 108 may be trained in a simulator, which may be safer than training in the real world. In training, states are sampled from a state space. A state space is a set of states that includes all possible states of the vehicle 100 and the environment at a particular time. The states sampled from the state space (i.e. sampled states) may also be referred to as training samples. For effective training of the RL agent 108, it is generally desirable to ensure that the state space is sufficiently explored to enable the RL agent 108 to perform well in challenging situations that may be rarely occurring.

In the field of reinforcement learning, a Vanilla Monte Carlo (VMC) sampling method is generally used for training and evaluation of an RL agent. VMC sampling methods may be shown to result in training an RL agent on many samples that have only a minor effect on the performance of the RL agent. This makes the methods inefficiently data hungry.

On the other hand, so-called "harder examples" may be rare among many sampled states that the RL agent may already be well-trained in (i.e., the RL agent already achieves satisfactory performance for such "easy" samples. Each "harder example" is a sampled state known to be more likely to cause the RL agent to generate actions that leads to failure. It is desirable for the RL agent to be trained on such harder examples, in order to learn a more robust policy. However, the rarity of harder examples means that, if using a uniform sampling method for sampling states from the state space, there is only a small chance of encountering a harder example during training. This problem may be said to result from unbalanced data.

In the autonomous vehicle 100, the RL agent 108 is expected to have been trained to output actions that the vehicle 100 executes safely. If the RL agent 108 outputs an action that causes the vehicle 100 to crash, then the RL agent 108 is considered to have failed at performing the task (e.g., the driving of the vehicle 100). A single crash of the vehicle 100 outweighs the benefits of faultless operation of the vehicle 100 by the RL agent 108 for thousands of kilometers. In other words, a very small probability of failure, ε, of the RL agent 108 of performing a task is preferred. Therefore, during training and evaluation of the RL agent 108 using well-known training methods, a large number of training samples sampled from the state space is needed to ensure that a probability of failure, ε, is below a predetermined threshold. That is, a large number of training samples is needed to ensure that the RL agent 108 has been asked to solve the task using enough "harder examples" that the RL agent may be considered to be robust.

Additionally, the large cost of failure indicates that this particular problem does not have a tightly bounded reward. Overestimating the performance of the RL agent 108 during the evaluation may result in an unreliable RL agent when the trained RL agent (i.e., the RL agent 108 implementing a learned policy) is deployed in the real world. Moreover, most RL algorithms do not guarantee monotonic improvement as the policy is updated during training. Hence, simply increasing the number of training samples may not result in an RL agent 108 that has good performance when deployed in the real world.

The problem of unbalanced data has been well studied in supervised learning. As an agent learns to perform a task using supervised learning, the agent improves at performing a task, and training samples may be determined to be "easy" for the agent. The determination regarding whether a sample is "easy" may be based on the performance of the agent during the training. There are also training samples that may be determined to be "hard" for the agent. Many supervised learning techniques attempt to focus on harder samples during the training to improve the performance of the trained agent. Hard example mining is one of the methods that may be used in many supervised learning techniques and is known to be used in many applications, such as object detection. However, it may be considered that, in the RL literature, the essence of "hard example mining" has been overlooked.

In overview, the present disclosure provides an approach that employs the essence of hard example mining as applied in a reinforcement learning context. By employing an adversarial sampling method for training an agent using reinforcement leaning, the resulting agent (referred to hereinafter as the RL agent 108) may be considered to be particularly robust.

In various examples, the present disclosure describes methods that may be used by the learning controller 110 to improve the RL agent 108. The disclosed methods begin with preliminary training of the RL agent 108. In the preliminary training, the training samples are randomly and uniformly sampled from the state space. The reason for the randomness is that, initially, all the states in the state space are informative for the RL agent 108 and each sampled training sample (i.e. sampled state) is expected to have some new information from which the RL agent 108 may learn, in a conventional reinforcement learning context. The RL agent 108 learns from both failures and successes. The definition of failure depends on the task the RL agent 108 is designed to carry out. In the context of the present disclosure, a failure is defined as an event where the RL agent 108 outputs an action that does not result is safe operation (e.g., driving) of the vehicle 100.

In the preliminary training, the RL agent 108 is trained using state transition tuples. The state transition tuples may each, for example, include an individual sampled state with associated action, reward and next state. A reward is generally computed using a reward function. The reward function is designed to generate feedback (in terms of the reward) based on the sampled state (denoted as $s_t$), the action (denoted as $a_t$) generated by the RL agent 108 and the next state (denoted as $s_{t+1}$). The reward function is designed to generate rewards such that subjectively appropriate actions, given a particular state, are associated with higher rewards and subjectively inappropriate actions, given the same particular state, are associated with lower rewards.

After a predetermined performance threshold has been attained, training may continue but with consideration of possibility of failure. In the present disclosure, the failure predictor 126 is trained (using supervised learning) using the failure predictor controller 128. For training the failure predictor 126, the RL agent 108 collects data. This data includes states, a subset of the parameters of the RL agent 108 or the parameters which are agent-related, such as an age for the RL agent 108, and a label for each instance where the RL agent 108 experiences failure. Failure of the RL agent 108 may be defined as the vehicle 100 ending up in an undesired situation (e.g., collision). Failure may be defined differently for different environments and for different tasks to be carried out by the vehicle 100.

After the failure predictor 126 is trained, training of the RL agent 108 continues using the trained failure predictor 126. In this failure-prediction-based training, a probability of failure is used to stochastically sample a state from the state space (e.g., use may be made of the known rejection sampling method).

In the preliminary training (which may take place in a simulator), the RL agent 108 outputs actions to be executed by the vehicle 100 in the environment 102. Based on a sampled state, the RL agent 108 outputs the action to be executed by the vehicle 100 and receives a reward. The reward is used to update the policy (e.g., update the weights of a neural network that is used to model the policy). As the RL agent 108 experiences more samples over many training iterations, the performance of the RL agent 108 improves. After a predetermined performance criteria is satisfied, a data collection mode is invoked. In the data collection mode, the RL agent 108 continues to receive states and output actions for execution by the vehicle 100 while the learning controller 110 collects data. The data collected by the learning controller 110 may include states, a subset of agent parameters or the parameters which are agent-related, such as an age for the RL agent 108, and a label for a failure. The learning controller 110 remains in the data collection mode until a predetermined number of iterations of training are performed.

Figure 2:
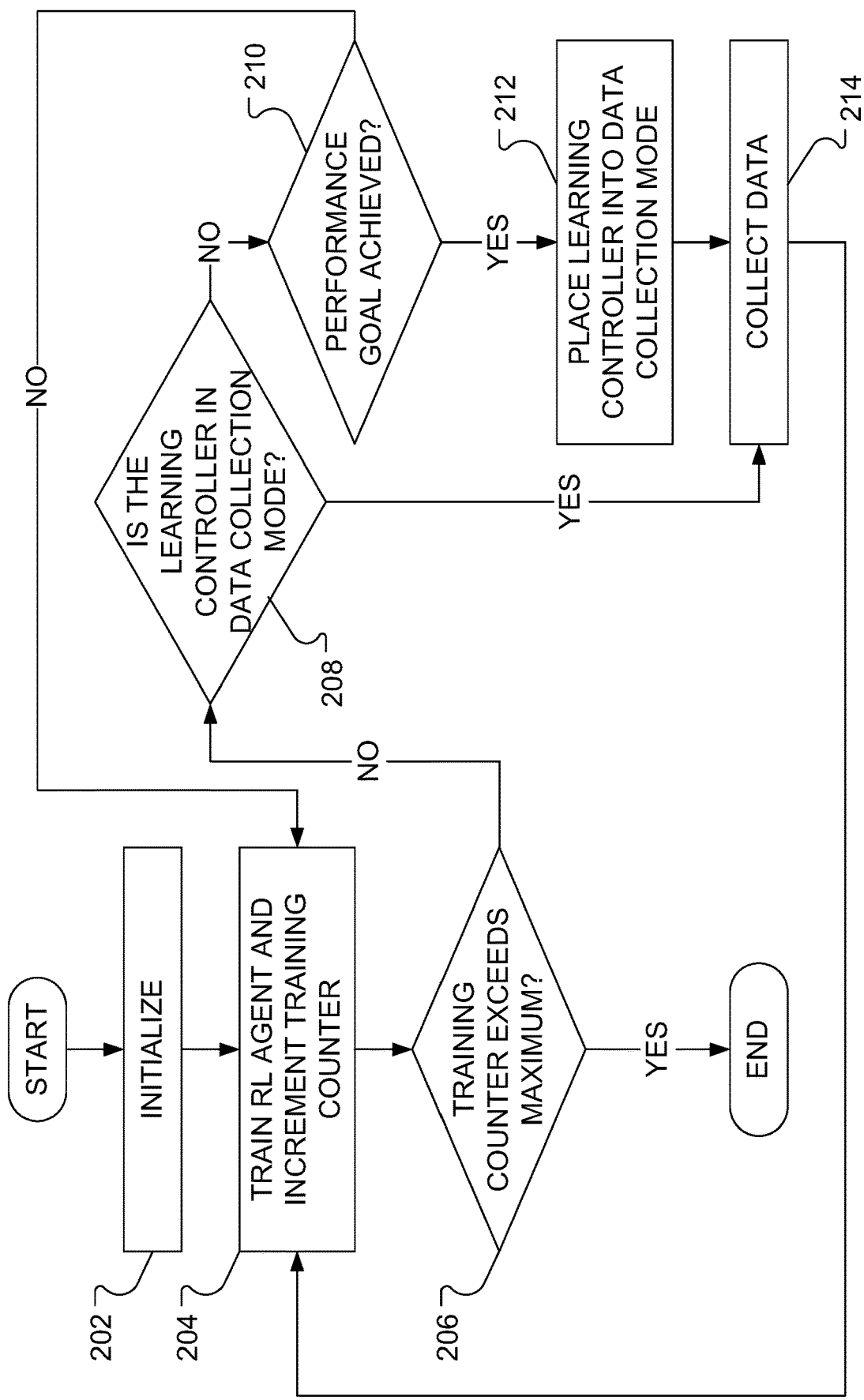
FIG. 2 illustrates steps in an example method representative of a preliminary training of an RL agent, in accordance with aspects of the present application.

FIG. 2 illustrates steps in an example method representative of the preliminary training. The method begins with initializing (step 202). The initializing (step 202) may include the learning controller 110 setting a training iteration counter to zero, establishing a maximum number of training iterations and establishing that the learning controller 110 is not in data collection mode.

The learning controller 110 executes a learning algorithm to train (step 204) the RL agent 108. Training the RL agent 108 may, for example, involve establishing an initial set of parameters for the RL agent 108 and allowing for interaction between the vehicle 100 and the environment 102, with the vehicle 100 executing actions outputted by the RL agent 108. Allowing for interaction between the vehicle 100 and the environment 102 may involve actual physical interaction between the vehicle 100 and the environment 102. Alternatively, allowing for interaction between the vehicle 100 and the environment 102 may involve simulated interaction between the vehicle 100 and the environment 102 (e.g., in a simulator). As is conventional in the case of reinforcement learning, the RL agent 108 will self-improve by fine tuning its own parameters to cause the vehicle 100 to perform an appointed task in a manner that measurably improves performance of the vehicle 100 in the environment 102. Consequently, the performance of the RL agent 108 may be considered to have undergone a measureable performance improvement. Associated with the training of the RL agent 108 is the learning controller 110 incrementing (also step 204) of the training iteration counter.

The learning controller 110 then determines (step 206) whether the training iteration counter has exceeded the maximum number of training iterations. If the learning controller 110 determines (step 206) that the training iteration counter has exceeded the maximum number of training iterations, the preliminary training is complete. However, if the learning controller 110 determines (step 206) that the training iteration counter has not exceeded the maximum number of training iterations, then the learning controller 110 determines (step 208) whether the learning controller 110 is in data collection mode. If the learning controller 110 determines (step 208) that the learning controller 110 is in data collection mode, the learning controller 110 collects (step 214) data directly resulting from the training (step 204) of the RL agent 108. The collected data includes states, a subset of the parameters that define the RL agent 108 or the parameters which are agent-related, such as an age for the RL agent 108, and a label for each failure. In the present disclosure, the term "collected data" refers to the states provided to the RL agent 108 and the failure or success of the RL agent 108 in performing the task in a certain time horizon. The collected data may be stored (e.g., in a buffer of the memory 106) for later retrieval. Upon completion of the data collection (step 214), the learning controller 110 returns to train (step 204) the RL agent 108 and increment (step 204) the training iteration counter.

If the learning controller 110 determines (step 208) that the learning controller 110 is not in data collection mode, the learning controller 110 determines (step 210) whether a predetermined performance goal has been achieved.

As discussed hereinbefore, evaluation of the RL agent 108 may involve determining that a probability of failure, $\varepsilon$, is below a predetermined threshold. Accordingly, the determining (step 210) that the predetermined performance goal has been achieved, in one example embodiment, involves determining that a probability of failure, $\varepsilon$, is below a predetermined threshold.

Upon determining (step 210) that the predetermined performance goal has been achieved, the learning controller 110 places (step 212) itself in data collection mode. The learning controller 110 collects (step 214) data and returns to train (step 204) the RL agent 108, as described hereinbefore.

Responsive to determining (step 210) that the predetermined performance goal has not been achieved, the learning controller 110 returns to train (step 204) the RL agent 108, as described hereinbefore.

Figure 3:
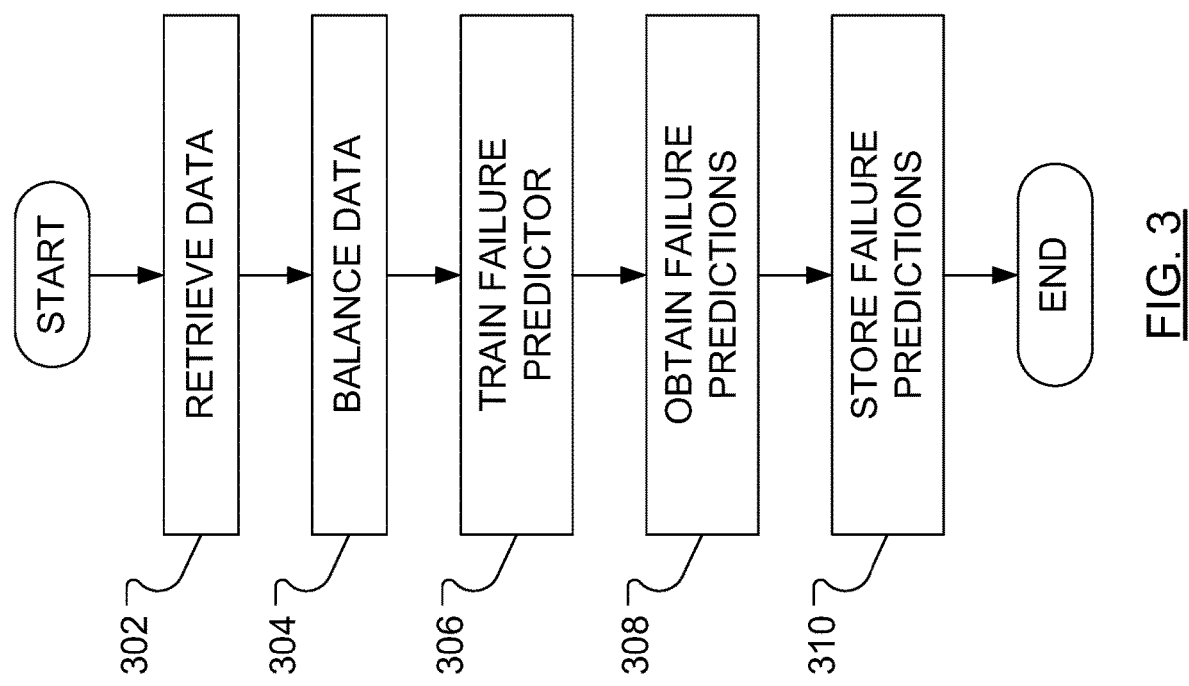
FIG. 3 illustrates steps in an example method representative of a preliminary training of a failure predictor, in accordance with aspects of the present application.

FIG. 3 illustrates steps in an example method representative of the preliminary training of the failure predictor 126. It should be understood that the failure predictor 126 may be updated during further failure-prediction-based training of the RL agent 108 (see FIG. 4). The failure predictor controller 128 initially retrieves (step 302) collected data (e.g., stored in a buffer of the memory 106). The failure predictor controller 128 then balances (step 304) the collected data using any suitable supervised learning. Technique. Data may be considered imbalanced when the data unequally reflect a certain class. In the context of the present disclosure, the collected data may be considered imbalanced if there is significantly more data labeled as success (i.e., success is an excessive class), compared to data labeled as failure (i.e., failure is a rare class), or vice versa. Some example techniques that may be used to balance the collected data include: under-sampling from the excessive class compared to the rare class; over-sampling or resampling (i.e., generating repetitions) the rare class; or clustering the excessive class and using cluster representatives as the data in the excessive class; among other possibilities.

In a general reinforcement learning setting, data processing begins with a balanced combination between failure cases and success cases. In the general reinforcement learning setting, as the RL agent becomes increasingly robust, the failure cases become increasingly rare. It may be considered that there are benefits to the RL agent 108 continuing to have the opportunity to learn from both failure cases and success cases.

If the RL agent 108 bases learning on subjectively too many successful cases, it is predictable that the RL agent 108 will become vulnerable against failure cases.

The failure predictor controller 128 executes an algorithm to train (step 306) the failure predictor 126 using the retrieved collected data. The failure predictor 126 may implement a model that predicts, given a scenario (a sequence of states) and a set of agent parameters (i.e. parameters of the RL agent 108), whether the RL agent 108 will fail in a given time horizon (a time horizon being defined as a number of time steps), and output a failure prediction indicative of whether the RL agent will fail in a given time horizon. The model implemented in the failure predictor 126 $o$ may be learned using any machine learning algorithm.

Once the failure predictor 126 has been trained, the failure predictor controller 128 then obtains (step 308) some failure predictions generated by the failure predictor 126. The failure predictor controller 128 provides a sequence of collected data to the failure predictor 126, which generates a sequence of corresponding failure predictions, and provides the sequence of failure predictions to the failure predictor controller 128. The failure predictor controller 128 then stores (step 310) the failure predictions together with the respective collected data (e.g., in a buffer of the memory 106).

After preliminary training of the failure predictor 126, failure-prediction-based training of the RL agent 108 takes place. In failure-prediction-based training, the learning controller 110 trains the RL agent 108 using the sequence of collected data for which the probability of failure has already been obtained, by the failure predictor controller 128 in step 308 described above.

Figure 4:
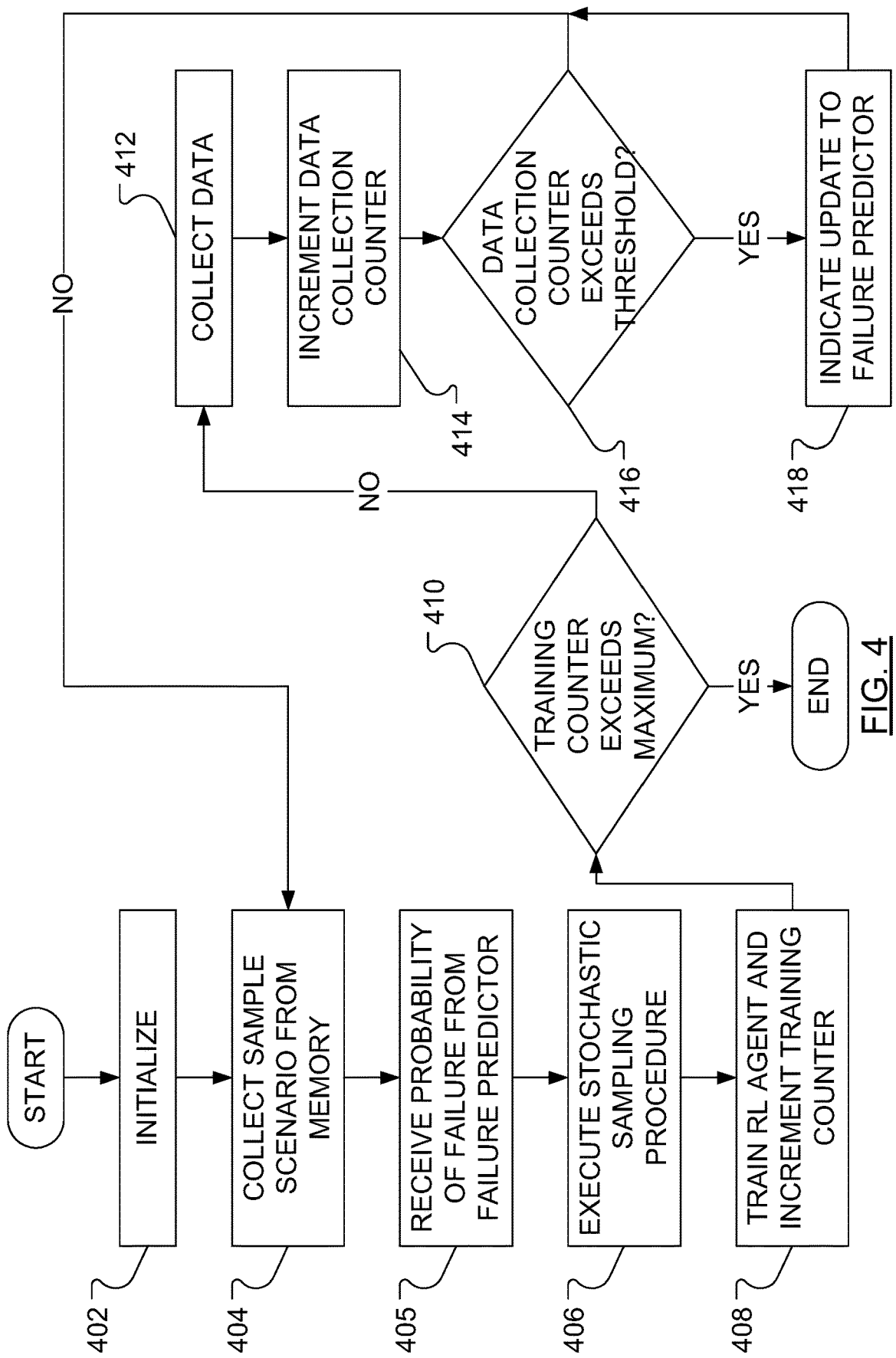
FIG. 4 illustrates steps in an example method representative of a training of an RL agent, using a failure predictor, in accordance with aspects of the present application.

FIG. 4 illustrates steps in an example method representative of the failure-prediction-based training.

The learning controller 110 begins the failure-prediction-based training with initialization (step 402). The initialization (step 402) may include initializing the RL agent 108 by restoring the agent parameters that the RL agent 108 had at the end of the preliminary training. The initialization (step 402) may also include establishing a maximum number of iterations. Further, the initialization (step 402) may include initializing the training counter to zero and initializing a data collection counter to zero.

The learning controller 110 may then collect (step 404) a sample scenario (a sequence of states) from the buffer of the memory 106. The failure predictor 126 predicts the probability of failure, based on the sample scenario collected in step 404 and the supervised learning accomplished in the preliminary training of the failure predictor 126, under control of the failure predictor controller 128. Indeed, when the failure predictor 126 has been trained, the failure predictor 126 receives, as input, a sample scenario and parameters of the RL agent 108 and produces, as output, a probability of failure. The learning controller 110 receives (step 405) the probability of failure and uses (step 406) the probability of failure while executing (step 406) a stochastic sampling procedure. One examples of a stochastic sampling procedure is the known rejection sampling algorithm.

In numerical analysis and computational statistics, the known rejection sampling algorithm is a basic technique used to generate observations from a distribution. The known rejection sampling algorithm is based on an observation that, to sample a random variable in one dimension, one can perform a uniformly random sampling of a two-dimensional Cartesian graph and keep only the samples in the region under a graph of the probability density function of the random variable. The known rejection sampling algorithm can be extended to probability density functions in N-dimensions.

A result of the execution of the stochastic sampling procedure (step 406) is a selection of some so-called harder example scenarios on which to train the RL agent 108. The RL agent 108 is then trained (step 408), using the example scenarios.

It is known that the RL agent 108 may cause the vehicle 100 to interact with the environment 102 in multiple ways and, after collecting data for various scenarios (sequences of states), the failure predictor 126 is improved in its ability to predict the failure probability for each scenario. The learning controller 110 can then decide to continue the trajectory with the highest probability of failure. The learning controller 110 may then determine (step 410) whether the value of the training counter exceeds the maximum number of training iterations established in step 402.

Upon determining (step 410) that the value of the training counter exceeds the maximum number of training iterations, the failure-prediction-based training may be considered to be complete and the RL agent 108 may be considered to be fully trained.

Upon determining (step 410) that the value of the training counter does not exceed the maximum number of training iterations, the learning controller 110 may collect (step 412) more data. Similar to step 214, the collected data may include sequences of states of the environment 102, a subset of the agent parameters or the parameters which are agent-related, such as an age for the RL agent 108, and a label for each failure.

The learning controller 110 may then increment (step 414) the data collection counter and determine (step 416) whether the value of the data collection counter exceeds a predetermined maximum number of data collection iterations.

Upon determining (step 416) that the value of the data collection counter does not exceed the predetermined maximum number of data collection iterations, the learning controller 110 may return to step 404 to collect another sample scenario from the memory 106.

Upon determining (step 416) that the value of the data collection counter exceeds the predetermined maximum number of data collection iterations, the learning controller 110 may update (step 418) the parameters of the failure predictor 126 using the new collected data.

Conveniently, aspects of the present application take the performance of the RL agent 108 into account when collecting (step 404) sample scenarios from the memory 106.

In various examples, the present disclosure describes methods and systems that predicts a probability of failure for collected samples, and to focus training of the RL agent on those samples that are predicted to be more challenging. The disclosed examples may result in more sample efficient training of the RL agent, and may result in a more robust RL agent after training.

All values and sub-ranges within disclosed ranges are also disclosed. Also, although the systems, devices and processes disclosed and shown herein may comprise a specific number of elements/components, the systems, devices and assemblies may be modified to include additional or fewer of such elements/components. For example, although any of the elements/components disclosed may be referenced as being singular, the embodiments disclosed herein may be modified to include a plurality of such elements/components. The subject matter described herein intends to cover and embrace all suitable changes in technology.

Although the present disclosure is described, at least in part, in terms of methods, a person of ordinary skill in the art will understand that the present disclosure is also directed to the various components for performing at least some of the aspects and features of the described methods, be it by way of hardware (DSPs, GPUs, ASIC, or FPGAs), software or a combination thereof. Accordingly, the technical solution of the present disclosure may be embodied in a non-volatile or non-transitory machine readable medium (e.g., optical disk, flash memory, etc.) having stored thereon executable instructions tangibly stored thereon that enable a processing device to execute examples of the methods disclosed herein.

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. The scope of the claims should not be limited by the embodiments set forth in the examples, but should be given the broadest interpretation consistent with the description as a whole.

What is claimed is:

1. A method of training a reinforcement learning (RL) agent for autonomous operation of a vehicle, the method comprising:
    training the RL agent by:
        obtaining training samples by uniformly sampling a state space including all possible states of the vehicle and the environment; and
        learning a policy to map sampled states to actions outputted by the RL agent, the policy being learned by updating parameters of a neural network;
    determining that the RL agent has achieved a predetermined performance goal;
    collecting data, collected data including a sequence of sampled states, the collected data further including, for each sequence of sampled states, agent parameters, and an indication of failure of the RL agent for the sequence;
    training, using samples from the collected data, a failure predictor to predict a probability of failure of the RL agent for a given sequence of states;
    simulating interaction of the vehicle with the environment to collect a plurality of sequences of states;
    selecting, using the probability of failure outputted by the failure predictor, in a stochastic sampling method, a selected sequence of states from among the plurality of sequences of states; and
    further training the RL agent based on the selected sequence of states.

2. The method of claim 1 wherein the failure predictor is configured to predict, based on each sequence of states among the plurality of sequences of states, a likelihood of failure for the RL agent.

3. The method of claim 2 wherein training the failure predictor comprises optimization using an optimization algorithm selected from a Stochastic Gradient Descent family of optimizers.

4. The method of claim 1 further comprising repeating the simulating, selecting and further training until a predetermined number of repetitions is reached.

5. The method of claim 1, wherein the stochastic sampling method for selecting the selected sequence of states is a rejection sampling algorithm to reject sequences based on the probability of failure, and wherein sequences with a higher probability of failure is selected.

6. The method of claim 1, wherein collecting data is initiated after training the RL agent for a predetermined number of iterations.

7. A system for training a reinforcement learning (RL) agent for autonomous operation of a vehicle, the system comprising:
    a memory;
    a processor coupled to the memory, the processor configured to execute instructions stored in the memory, to cause the system to:
        train the RL agent by:
            obtaining training samples by uniformly sampling a state space including all possible states of the vehicle and the environment; and
            learning a policy to map sampled states to actions outputted by the RL agent, the policy being learned by updating parameters of a neural network;
        determine that the RL agent has achieved a predetermined performance goal;
        collect data, collected data including a sequence of sampled states, the collected data further including, for each sequence of sampled states, agent parameters, and an indication of failure of the RL agent for the sequence;
        train, using samples from the collected data, a failure predictor to predict a probability of failure of the RL agent for a given sequence of states;
        simulate interaction of the vehicle with the environment to collect a plurality of sequences of states;
        select using the probability of failure outputted by the failure predictor, in a stochastic sampling method, a selected sequence of states from among the plurality of sequences of states; and
        further train the RL agent based on the selected sequence of states.

8. The system of claim 7 wherein the failure predictor is configured to predict, based on each sequence of states among the plurality of sequences of states, a likelihood of failure for the RL agent.

9. The system of claim 8 wherein the processor is configured to execute the instructions to further cause the system to train the failure predictor by performing optimization using an optimization algorithm selected from a Stochastic Gradient Descent family of optimizers.

10. The system of claim 7 wherein the processor is configured to execute the instructions to further cause the system to repeat the simulating, selecting and further training until a predetermined number of repetitions is reached.

11. The system of claim 7, wherein the stochastic sampling method for selecting the selected sequence of states is a rejection sampling algorithm to reject sequences based on the probability of failure, and wherein sequences with a higher probability of failure is selected.

12. The system of claim 7, wherein the processor is configured to execute the instructions to further cause the system to initiate collecting data after training the RL agent for a predetermined number of iterations.

13. A computer-readable medium storing instructions, the instructions, when executed by a processor, causing a processor to train a reinforcement learning (RL) agent for autonomous operation of a vehicle by:
    training the RL agent by:
        obtaining training samples by uniformly sampling a state space including all possible states of the vehicle and the environment; and
        learning a policy to map sampled states to actions outputted by the RL agent, the policy being learned by updating parameters of a neural network;
    determining that the RL agent has achieved a predetermined performance goal;
    collecting data, collected data including a sequence of sampled states, the collected data further including, for each sequence of sampled states, agent parameters, and an indication of failure of the RL agent for the sequence;
    training, using samples from the collected data, a failure predictor to predict a probability of failure of the RL agent for a given sequence of states;
    simulating interaction of the vehicle with the environment to collect a plurality of sequences of states;

selecting, using the probability of failure outputted by the failure predictor, in a stochastic sampling method, a selected sequence of states from among the plurality of sequences of states; and further training the RL agent based on the selected sequence of states.

14. The computer-readable medium of claim 13 wherein the failure predictor is configured to predict, based on each sequence of states among the plurality of sequences of states, a likelihood of failure for the RL agent.

15. The computer-readable medium of claim 14 wherein the instructions, when executed by a processor, further cause the processor to train the failure predictor by performing optimization using an optimization algorithm selected from a Stochastic Gradient Descent family of optimizers.

16. The computer-readable medium of claim 13 wherein the instructions, when executed by a processor, further cause the processor to repeat the simulating, selecting and further training until a predetermined number of repetitions is reached.

17. The computer-readable medium of claim 13, wherein the stochastic sampling method for selecting the selected sequence of states is a rejection sampling algorithm to reject sequences based on the probability of failure, and wherein sequences with a higher probability of failure is selected.

18. The computer-readable medium of claim 13 wherein the instructions, when executed by a processor, further cause the processor to initiate collecting data after training the RL agent for a predetermined number of iterations.

* * * * *